(12) United States Patent
Sohn et al.

(10) Patent No.: US 8,270,144 B2
(45) Date of Patent: Sep. 18, 2012

(54) BOROSILICATE GLASS COMPOSITIONS FOR SINTERING AGENT, DIELECTRIC COMPOSITIONS AND MULTILAYER CERAMIC CAPACITOR USING THE SAME

(75) Inventors: Sung Bum Sohn, Gyunggi-do (KR); Young Tae Kim, Gyunggi-do (KR); Kang Heon Hur, Gyunggi-do (KR); Min Hee Hong, Gyunggi-do (KR); Hew Young Kim, Gyunggi-do (KR); Doo Young Kim, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 425 days.

(21) Appl. No.: 12/504,171

(22) Filed: Jul. 16, 2009

(65) Prior Publication Data

US 2010/0165542 A1   Jul. 1, 2010

(30) Foreign Application Priority Data

Dec. 29, 2008 (KR) .................. 10-2008-0135771

(51) Int. Cl.
*H01G 4/06* (2006.01)
(52) U.S. Cl. ............. 361/313; 361/321.5; 361/320; 361/321.1; 361/321.4; 501/2; 501/27; 501/137
(58) Field of Classification Search ............. 361/321.5, 361/313, 320, 321.1, 321.4; 501/2, 27, 137
See application file for complete search history.

(56) References Cited

U.S. PATENT DOCUMENTS

| | | | | |
|---|---|---|---|---|
| 4,977,485 A | * | 12/1990 | Mori et al. | 361/321.4 |
| 5,117,326 A | * | 5/1992 | Sano et al. | 361/321.4 |
| 5,659,456 A | * | 8/1997 | Sano et al. | 361/321.4 |
| 6,949,487 B2 | | 9/2005 | Ito et al. | |
| 7,079,374 B1 | * | 7/2006 | Kim et al. | 361/321.4 |
| 7,567,428 B2 | * | 7/2009 | Sohn et al. | 361/321.4 |
| 7,605,104 B2 | * | 10/2009 | Sohn et al. | 501/138 |
| 7,691,762 B2 | * | 4/2010 | Sohn et al. | 501/21 |
| 8,102,223 B2 | * | 1/2012 | Umemoto et al. | 333/185 |

FOREIGN PATENT DOCUMENTS

| | | |
|---|---|---|
| JP | 2002-356371 | 12/2002 |
| JP | 2003-089543 A | 3/2003 |
| JP | 2004-292306 A | 10/2004 |

OTHER PUBLICATIONS

Japanese Office Action, and English translation thereof, issued in Japanese Patent Application No. 2009-179008 dated May 29, 2012.

* cited by examiner

*Primary Examiner* — Nguyen T Ha
*Assistant Examiner* — Hung Dang
(74) *Attorney, Agent, or Firm* — McDermott Will & Emery LLP

(57) ABSTRACT

The present invention relates to borosilicate glass compositions for a sintering agent, dielectric compositions containing the borosilicate glass compositions and a multilayer ceramic capacitor using the dielectric compositions. Borosilicate glass compositions for a sintering agent according to an aspect of the invention include an alkali oxide, an alkaline earth oxide and a rare earth oxide, can sinter ceramic dielectrics at low temperatures and improve the hot insulation resistance of a multilayer ceramic capacitor. Correspondingly, dielectric compositions including these borosilicate glass compositions and a multilayer ceramic capacitor using the dielectric compositions can be sintered at a low temperature of 1100° C. or less and have high hot insulation resistance, thereby ensuring high levels of reliability.

13 Claims, 1 Drawing Sheet

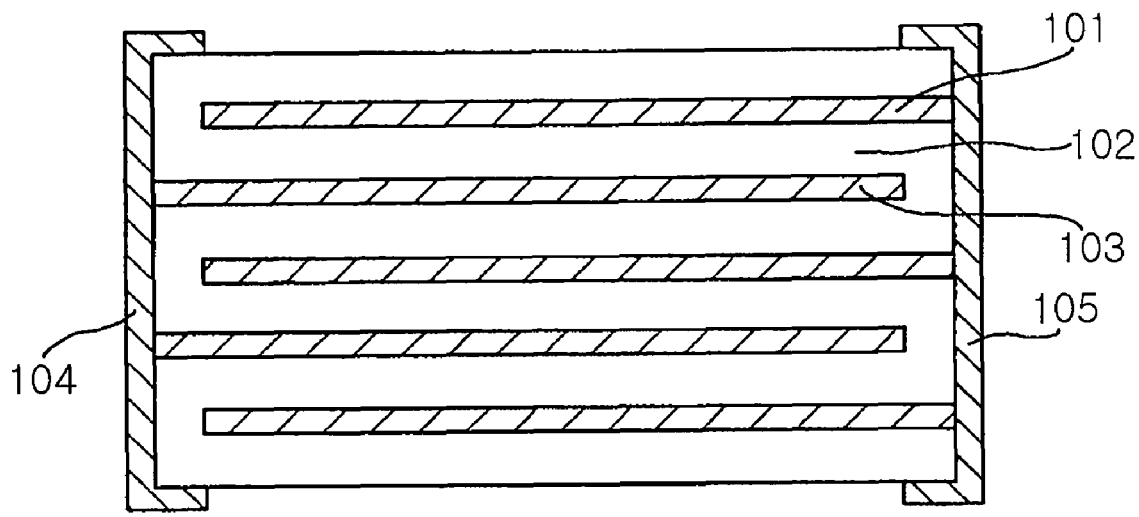

BOROSILICATE GLASS COMPOSITIONS FOR SINTERING AGENT, DIELECTRIC COMPOSITIONS AND MULTILAYER CERAMIC CAPACITOR USING THE SAME

CROSS-REFERENCE TO RELATED APPLICATIONS

This application claims the priority of Korean Patent Application No. 2008-0135771 filed on Dec. 29, 2008, in the Korean Intellectual Property Office, the disclosure of which is incorporated herein by reference.

BACKGROUND OF THE INVENTION

1. Field of the Invention

The present invention relates to multilayer ceramic capacitors, and more particularly, to borosilicate glass compositions for a sintering agent, dielectric compositions containing the borosilicate glass compositions and a multilayer ceramic capacitor using the dielectric compositions that allow low-temperature sintering and improve hot insulation resistance.

2. Description of the Related Art

Recently, with rapid advancements in miniaturization, lightweight and multifunctionality of electrical and electronic devices, multilayer ceramic capacitors (MLCCs), used in these electric and electronic products, have been reduced in weight and increased in capacitance. Dielectric layers, used in multilayer ceramic capacitors, are also continually being reduced in thickness, and the number of dielectric layers being laminated is growing increasingly large.

Important factors, which need to be taken into account when developing ultra high capacitance multilayer ceramic capacitors, include the realization of exceptionally high capacitance and ensuring a high level of reliability. In general, the reliability of multilayer ceramic capacitors is determined according to the results of evaluating hot insulation resistance and humid insulation resistance. Hot insulation resistance is generally determined by material factors, such as the degradation characteristics of dielectrics or internal electrode materials, and the microstructural defects in them. Humid insulation resistance is determined by processing factors, such as interlayer defects and micro-cracks in marginal area or inside the external electrodes, which are caused by process failures. In particular, when hundreds of ultra-thin dielectric layers are stacked and fired for preparing the ultra high capacitance MLCCs with an X5R thermal property, insulation resistance rapidly decreases as a DC voltage is applied at a usable temperature of 85° C. or less. Therefore, in order to develop ultra high capacitance MLCCs, it is necessary to ensure that dielectric materials have the properties of high permittivity and enhanced hot insulation resistance at the same time.

Furthermore, in order to manufacture ceramic capacitors having ultra-thin dielectric layers, dielectric compositions that can be sintered at low temperatures need to be used. When a sintering process is performed at high temperatures in order to manufacture multilayer ceramic capacitors, sintering shrinkage mismatch occurs between dielectric layers and internal electrodes, and an agglomeration of the internal electrodes is worsened. As a result, the capacitance of the ceramic capacitors is reduced, and the short ratio increases.

However, sintering agents in general use have an optimum sintering temperature ranging from 1500° C. to 1200° C. and thus are not appropriate for use when manufacturing a multilayer ceramic capacitor having ultra-thin dielectric layers.

Therefore, in order to manufacture ultra high capacitance MLCCs with high reliability that include ultra-thin dielectric layers, dielectric compositions that can be sintered at low temperatures and have enhanced hot insulation resistance are required.

SUMMARY OF THE INVENTION

An aspect of the present invention provides borosilicate glass compositions for a sintering agent, dielectric compositions containing the borosilicate glass compositions and a multilayer ceramic capacitor using the dielectric compositions that can sinter ceramic dielectrics at low temperatures and improve the hot insulation resistance of a multilayer ceramic capacitor.

According to an aspect of the present invention, there is provided a Borosilicate glass compositions for a sintering agent satisfying the following equation, $$aR_2O\text{-}bMO\text{-}cRe_2O_3\text{-}dB_2O_3\text{-}eSiO_2 \qquad \text{Equation,}$$

where $R_2O$ is an alkali oxide, MO is an alkaline earth oxide, $Re_2O_3$ is a rare earth oxide, $a+b+c+d+e=100$, $5\leq a\leq 20$, $0\leq b\leq 20$, $5\leq c\leq 20$, $10\leq d\leq 30$ and $40\leq e\leq 70$ are satisfied.

The $R_2O$ may be at least one alkali oxide selected from the group consisting of $Li_2O$ and $K_2O$.

The MO may be at least one alkaline earth oxide selected from the group consisting of CaO and BaO.

The $Re_2O_3$ may be at least one rare earth oxide selected from the group consisting of $Y_2O_3$, $Ho_2O_3$ and $Dy_2O_3$.

According to an aspect of the present invention, there is provided dielectric compositions including: barium titanate ($BaTiO_3$); and 0.1 to 3.0 moles of glass powder containing the borosilicate glass compositions according to claim 1 per 100 moles of the barium titanate ($BaTiO_3$).

The barium titanate ($BaTiO_3$) may have a mean diameter ranging from 150 nm to 200 nm.

The glass powder may have a mean diameter ranging from 100 nm to 150 nm.

The dielectric compositions may further include at least one additive selected from the group consisting of MgO, a rare earth oxide, MnO and $V_2O_5$.

The rare earth oxide may include at least one selected from $Y_2O_3$, $Ho_2O_3$ and $Dy_2O_3$.

According to an aspect of the present invention, there is provided a multilayer ceramic capacitor including: a plurality of dielectric layers containing the dielectric compositions according to claim 5; internal electrodes provided between the dielectric layers; and external electrodes electrically connected to the internal electrodes.

Each of the dielectric layers may have a thickness ranging from 1.0 μm to 1.5 μm.

The internal electrodes may include nickel (Ni) or Ni alloy.

The external electrodes may include Cu or Ni.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a cross-sectional view illustrating a multilayer ceramic capacitor according to an exemplary embodiment of the present invention.

DETAILED DESCRIPTION OF THE PREFERRED EMBODIMENT

Borosilicate glass compositions for a sintering agent according to an exemplary embodiment of the invention are represented by the following Equation:

$$aR_2O\text{-}bMO\text{-}cRe_2O_3\text{-}dB_2O_3\text{-}eSiO_2 \quad \text{Equation,}$$

where $R_2O$ is alkali oxides, MO is alkaline earth oxides, $Re_2O_3$ is rare earth oxides, a+b+c+d+e=100, 5≦a≦20, 0≦b≦20, 5≦c≦20, 10≦d≦30 and 40≦e≦70 are satisfied.

BaO and $SiO_2$, which are generally used as sintering agents of ceramic dielectrics, improve the permittivity of the ceramic dielectrics and ensure reliability. However, it is difficult to reduce the sintering temperature below 1200° C. or less. Furthermore, silicate glass or phosphate glass may reduce the sintering temperature, but, at the same time, worsens the hot insulation resistance of capacitors. However, according to the embodiment of the invention, borosilicate glass compositions for a sintering agent have a low melting point, allow ceramic dielectrics to be sintered at a low temperature of 1100° C. or less and improve the hot insulation resistance of a multilayer ceramic capacitor.

Hereinafter, individual components of borosilicate glass compositions for a sintering agent according to an exemplary embodiment of the invention will be described in detail.

The borosilicate glass compositions according to this embodiment include alkali oxides, alkaline earth oxides and rare earth oxides, including $B_2O_3$ and $SiO_2$ as basic components.

Here, $SiO_2$, included in the borosilicate glass compositions, is a glass network forming oxide and is the most important factor in determining the high-temperature fluidity of glass, the melting point of glass and the solubility of glass for ceramic dielectrics. The $SiO_2$ content, included in the borosilicate glass compositions, may preferably range from 40 mol % to 70 mol %, or more preferably, 45 mol to 65 mol %. When the $SiO_2$ content is less than 40 mol %, the solubility of glass for ceramic dielectrics is reduced. When the $SiO_2$ content exceeds 70 mol %, high-temperature fluidity is reduced, and the melting point increases. As a result, it becomes difficult to perform low-temperature sintering of the ceramic dielectrics.

Further, $B_2O_3$, included in the borosilicate glass compositions, is a glass network forming oxide and is an important factor in determining the solubility of glass for ceramic dielectrics together with $SiO_2$. In addition, $B_2O_3$ lowers the melting point of glass and contributes to improving high-temperature fluidity. The $B_2O_3$ content may be 10 mol % to mol %. When the $B_2O_3$ content is less than 10 mol %, high-temperature fluidity may be reduced. When the $B_2O_3$ content exceeds 30 mol %, the chemical durability of glass may be reduced due to the weakened structure of glass, and thus it becomes difficult to form glass with a stable structure.

The Alkali oxides $R_2O$, included in the borosilicate glass compositions, weaken the glass network structure consisting of $SiO_2$ and $B_2O_3$ to decrease the melting point of glass and improve high-temperature fluidity. The alkali oxides $R_2O$ may preferably include at least one selected from the group consisting of $Li_2O$ and $K_2O$, which are glass network modifying oxides. However, the invention is not limited thereto. The alkali oxides of $Li_2O$ and $K_2O$ chemically complement each other (mixed-alkali effect) to improve glass forming ability and high-temperature fluidity, enhance the chemical durability of glass and reduce the dielectric loss of dielectrics. Therefore, it is preferable to contain both $Li_2O$ and $K_2O$. The content of the alkali oxides $R_2O$ may range from 5 mol to 20 mol %. When the content of the alkali oxides $R_2O$ is less than 5 mol %, it is difficult to improve the high-temperature fluidity of glass. When the alkali oxides $R_2O$ exceeds 20 mol %, the glass network structure may be destroyed, reducing the chemical durability of glass. When $Li_2O$ or $K_2O$ is included as the alkali oxides $R_2O$, it is preferable that the content of alkali oxides should not exceed 11 mol %. When the oxide $R_2O$ content exceeds 11 mol %, the chemical durability of the glass may be reduced, and it may be difficult to form glass due to the crystallization and the weakening of glass network structure.

The alkaline earth oxides MO, included in the borosilicate glass compositions, stabilize the temperature coefficient of capacitance of the ceramic dielectrics. The alkaline earth oxides MO may preferably include at least one selected from the group consisting of CaO and BaO. The oxide CaO is a network modifying oxide to decrease the melting point of glass and enhance the structure of glass weakened by the inclusion of alkali oxides. Among the alkaline earth oxides, BaO decreases the melting point of glass the most significantly. BaO prevents sudden changes of high-temperature viscosity of glass to thereby prevent the abrupt sintering shrinkage of ceramics. The MO content of the alkaline earth oxides may range from 0 to 20 mol %. When the content exceeds 20 mol %, glass forming ability may be reduced, and low-temperature characteristics of the ceramic dielectrics may be deteriorated.

The rare earth oxides $Re_2O_3$, included in the borosilicate glass compositions, strengthen the structure of glass weakened by the alkali oxides together with the alkaline earth oxides. Furthermore, the rare earth oxides $Re_2O_3$ are incorporated into the surface of the ceramic dielectric particles ($BaTiO_3$) to form a core-shell structure, which improves the hot insulation resistance of the ceramic dielectrics. The rare earth oxides $Re_2O_3$ may preferably include at least one selected from the group consisting of $Y_2O_3$, $Ho_2O_3$ and $Dy_2O_3$. However, the invention is not limited thereto. The content of the rare earth oxides $Re_2O_3$ may range from 5 to 15 mol %. When the content exceeds 15 mol %, it is difficult to form glass, and low-temperature sintering characteristics are significantly deteriorated.

Dielectric compositions according to an exemplary embodiment of the invention include barium titanate ($BaTiO_3$) and 0.1 to 3.0 moles of glass powder having borosilicate glass compositions for a sintering agent per 100 moles of the barium titanate ($BaTiO_3$).

The dielectric compositions according to the embodiment of the invention include barium titanate ($BaTiO_3$) as ceramic dielectrics and glass powder produced using the above-described borosilicate glass compositions as a sintering agent. Glass compositions for a sintering agent according to an exemplary embodiment of the invention are produced using glass powder and are included in dielectric compositions. As described above, the borosilicate glass compositions for a sintering agent decrease the sintering temperature of ceramic dielectric layers and improve hot insulation resistance. The glass compositions according to this embodiment include super fine glass powder to maximize the dispersibility of the individual components. In particular, the sintering temperature of ceramic dielectric layers can be reduced to 1100° C. or less, thereby reducing the sintering shrinkage mismatch between the dielectric layers and the internal electrodes. Correspondingly, the aggregation of the internal electrodes can be reduced, thereby reducing the short ratio and ensuring high capacitance levels.

In order to form an ultra-thin dielectric layer, the ceramic dielectrics ($BaTiO_3$) preferably have a small mean diameter. Specifically, when ceramic dielectrics have a mean diameter ranging from 150 nm to 200 nm, an ultra-thin dielectric layer can have a thickness of 1 μm or less. Here, the mean diameter of accessory components, in addition to the ceramic dielectrics, may also be limited. Therefore, the glass powder, used as a sintering agent, may have an average grain size ranging from 100 nm to 150 nm. When the glass powder has an average grain size exceeding 150 nm, it becomes difficult to evenly sinter the ceramic dielectrics. Further, since glass powder having acicular or lumpy particles may cause uneven sintering, glass powder may have spherical particles.

According to a method of producing the glass powder, components, included in the borosilicate glass compositions for a sintering agent, are weighed and mixed, and then the mixture is melted at a temperature ranging from 1400° C. to 1500° C. Then, the melted product is rapidly cooled using a twin roller to obtain glass flakes, and the glass flakes are mechanically ground. The ground glass powder may be subjected to vapor heat treatment to produce ultra-fine spherical shape powder. However, the invention is not limited thereto.

The dielectric compositions according to this embodiment may further include at least one additive selected from the group consisting of MgO, rare earth oxides, MnO and $V_2O_5$.

The dielectric compositions may include 0.4 to 2.0 moles of MgO, 0.05 to 0.5 moles of MnO and 0.05 to 0.5 moles of $V_2O_5$ per 100 moles of the barium titanate ($BaTiO_3$).

The rare earth oxides may include at least one selected from the group consisting of $Y_2O_3$, $Ho_2O_3$ and $Dy_2O_3$. The dielectric compositions may include 0 to 1.0 moles per 100 moles of the barium titanate ($BaTiO_3$). The rare earth oxides are incorporated into the surface of the ceramic dielectric particles of barium titanate ($BaTiO_3$) to form a core-shell structure, which improves the hot insulation resistance of the ceramic dielectrics. Since the glass powder also includes rare earth components, the hot insulation resistance of the ceramic dielectrics can be further improved.

A multilayer ceramic capacitor according to this embodiment includes a plurality of dielectric layers having dielectric compositions, internal electrodes formed between the dielectric layers and external electrodes electrically connected to the internal electrodes.

FIG. 1 is a cross-sectional view illustrating a multilayer ceramic capacitor according to an exemplary embodiment of the invention. Modifications can be made, but the invention is not limited thereto.

Referring to FIG. 1, a multilayer ceramic capacitor 100 includes dielectric layers 102 and internal electrodes 101 and 103 that alternate with each other. External electrodes 104 and 105 are electrically connected to the corresponding internal electrodes 103 and 101, respectively.

The dielectric layers 102 are formed using the above-described dielectric compositions according to the embodiment of the invention. As described above, the dielectric compositions according to the embodiment of the invention can be sintered at a low temperature of 1100° C. or less and used to form a multilayer ceramic capacitor having improved hot insulation resistance. The thickness of the dielectric layers 102 is not particularly limited. In order to implement an ultra-slim super capacitor, one dielectric layer may be 1.5 µm or less. One dielectric layer may preferably range from 1.0 to 1.5 µm, or more preferably, from 1.0 to 1.2 µm.

Conductive materials, contained in the internal electrodes 101 and 103, are not particularly limited. However, since the dielectric layers 102 have excellent environmental resistance, the dielectric layers 102 may include, for example, nickel (Ni) or Ni alloy. Conductive materials, contained in the external electrodes 104 and 105, are not particularly limited but may include copper (Cu) or nickel (Ni).

A method of manufacturing a multilayer ceramic capacitor 100 is not particularly limited, and a general method being used in the related art can be used. For example, green sheets are formed using a slurry containing ceramic dielectrics, internal electrodes are printed onto the inside of the green sheets, and the green sheets having the internal electrodes thereon are sintered, thereby manufacturing the multilayer ceramic capacitor 100.

Hereinafter, a method of manufacturing a multilayer ceramic capacitor according to an exemplary embodiment of the invention will be described in detail.

Dielectric compositions including 100 moles of barium titanate ($BaTiO_3$) and 0.1 to 0.3 moles of glass powder per 100 moles of barium titanate according to an embodiment of the invention are prepared. The dielectric compositions may include 0.4 to 2.0 moles of MgO, 0 to 1.0 moles of rare earth oxides including at least one selected from the group consisting of $Y_2O_3$, $Ho_2O_3$ and $Dy_2O_3$, 0.05 to 0.5 moles of MnO or 0.05 to 0.5 moles of $V_2O_5$.

The dielectric compositions and an organic binder are mixed and dispersed using an organic solvent to produce a dielectric slurry. The organic solvent is not particularly limited, but may use ethanol or toluene. The organic binder is not particularly limited, but may use polyvinyl butyral.

Then, the dielectric slurry is formed into green sheets. A green sheet may be 1.5 µm or less thick. However, the invention is not limited thereto. An internal electrode is printed onto the formed green sheet. One or more green sheets having internal electrodes printed thereon are laminated to produce a laminate. The laminate is then compressed, cut into individual chips and heated at a temperature ranging from 250° C. to 450° C. to remove any volatile components, such as organic binders, included in the individual chips.

The laminate subjected to binder burnout is sintered. Here, the sintering temperature may be below 1100° C. A sintering temperature of 1150° C. or more may cause separation between dielectric layers and internal electrodes or an agglomeration of internal electrodes, leading to a short circuit of the internal electrodes and lowering reliability. As described above, however, the dielectric compositions according to this embodiment can be sintered at relatively lower temperatures in comparison to the related art. Therefore, the above-described problems are not caused.

Then, the external surface of the laminate is coated with a paste for forming external electrodes onto, which is then fired to form external electrodes. Here, plating may be performed on the surface of the external electrode to form a cladding layer.

Embodiment

Hereinafter, the invention will be described in more detail using inventive and comparative examples. However, the scope of the invention is not limited to the following embodiment.

Manufacture Glass Powder

Inventive Examples (a1 to a17)

As shown in Table 1, individual components were weighed, sufficiently mixed and melted at a temperature ranging from 1400° C. to 1500° C. The melted mixture was rapidly cooled using a twin roller to obtain glass flakes, which were then subjected to dry grinding and vapor heat treatment, thereby manufacturing ultra-fine spherical shape glass powder having an average particle size ranging from 100 nm to 150 nm.

Comparative Examples (b1 to b2)

As shown in Table 1, a mixture free of rare earth oxides was prepared, and glass powder was produced using the mixture according to the same method as in the inventive examples.

TABLE 1

| | | R$_2$O (mol %) | | MO (mol %) | | R$_e$2O$_3$ (mol %) | | | borosilicate (mol %) | |
|---|---|---|---|---|---|---|---|---|---|---|
| | | Li$_2$O | K$_2$O | CoO | BaO | Y$_2$O$_3$ | Ho$_2$O$_3$ | Dy$_2$O$_3$ | B$_2$O$_3$ | SiO$_2$ |
| Inventive Example | a1 | 3 | 2 | 10 | 5 | 5 | 5 | | 15 | 55 |
| | a2 | 3 | 2 | | 15 | 5 | | 5 | 15 | 55 |
| | a3 | 5 | 5 | 5 | 5 | 10 | 5 | | 25 | 40 |
| | a4 | 5 | 5 | 5 | 5 | 10 | | 5 | 25 | 40 |
| | a5 | 10 | | 5 | 5 | 15 | | | 10 | 55 |
| | a6 | 5 | 5 | 5 | 5 | | 15 | | 10 | 55 |
| | a7 | | 10 | 5 | 5 | | | 15 | 10 | 55 |
| | a8 | 10 | 5 | | 10 | 15 | | | 10 | 50 |
| | a9 | 10 | 5 | | 10 | 5 | 10 | | 10 | 50 |
| | a10 | 10 | 5 | | 10 | 5 | | 10 | 10 | 50 |
| | a11 | 10 | 5 | | 10 | | | 15 | 10 | 50 |
| | a12 | 10 | 5 | 5 | | 20 | | | 15 | 45 |
| | a13 | 10 | 5 | 5 | | 10 | 10 | | 15 | 45 |
| | a14 | 10 | 5 | 5 | | 10 | | 10 | 15 | 45 |
| | a15 | 10 | 10 | | | 10 | | | 10 | 60 |
| | a16 | 10 | 10 | | | | 10 | | 10 | 60 |
| | a17 | 10 | 10 | | | | | 10 | 10 | 60 |
| Comparative example | b1 | 3 | 2 | 10 | 5 | | | | 25 | 55 |
| | b2 | 10 | 5 | | 10 | | | | 20 | 55 |

Manufacture Ceramic Capacitor

Inventive Examples (A1 to A16) and Comparative Examples (B1 to B6)

In the case of the inventive examples according to the invention, low-stacked test specimens, formed by stacking 10 sheets or so, having a thickness of approximately 3 μm were first manufactured to observe general behaviors before manufacturing ultra-thin film•high-stacked film chips being commonly used.

Dielectric compositions were mixed with the above-described glass powders and dispersed using an organic solvent as shown in Table 2. Then, an organic binder was added to the mixture to form a slurry, which was then coated onto a film at a thickness of approximately 3 μm to form a dielectric sheet. Then, a Ni internal electrode was printed onto the dielectric sheet. Ten dielectric sheets having internal electrodes printed thereupon were laminated. This laminate was subjected to cold isostatic pressing (CIP) and cut into test specimens. The test specimens were subjected to heat treatment for more than four hours at a temperature of 400° C. to remove the organic binder and the dispersant. The test specimens were then sintered at temperature ranges, shown in Table 3, using a furnace whose temperature and atmosphere can be controlled. Here, the oxygen pressure in the firing atmosphere was controlled to an atmospheric pressure of $10^{-9}$ to $10^{-13}$. Cu external electrodes were coated onto the test specimens after being sintered, and were then fired at a temperature ranging from 700° C. to 900° C. After the external electrodes were completely fired, a plating process was performed to finish manufacturing the test specimen.

TABLE 2

| | Dielectrics | Additives (mol %) | | | | Sintering agent (mol %) | |
|---|---|---|---|---|---|---|---|
| | BaTiO$_3$ | MgO | Rare earth oxide | MnO | V$_2$O$_5$ | kind | content |
| B1 | 100 | 1.0 | 0.5 | 0.2 | 0.1 | b1 | 1.5 |
| B2 | 100 | 1.0 | 0.6 | 0.2 | 0.2 | b1 | 1.5 |
| B3 | 100 | 1.2 | 0.5 | 0.2 | 0.1 | b2 | 1.3 |
| B4 | 100 | 0.8 | 0.5 | 0.2 | 0.1 | b2 | 1.3 |
| B5 | 100 | 1.2 | 0.1 | 0.1 | 0.15 | a7 | 3.2 |
| B6 | 100 | 0.5 | 0.4 | 0.3 | 0.15 | a14 | 0.8 |
| A1 | 100 | 1.0 | 0.3 | 0.2 | 0.2 | a3 | 2.0 |
| A2 | 100 | 1.0 | 0.3 | 0.2 | 0.2 | a4 | 2.0 |
| A3 | 100 | 1.2 | 0.3 | 0.2 | 0.1 | a5 | 1.7 |
| A4 | 100 | 1.2 | 0.3 | 0.2 | 0.1 | a6 | 1.7 |
| A5 | 100 | 1.2 | 0.3 | 0.1 | 0.15 | a7 | 1.7 |
| A6 | 100 | 1.2 | 0.4 | 0.1 | 0.15 | a7 | 1.0 |
| A7 | 100 | 1.0 | 0.2 | 0.05 | 0.2 | a8 | 1.5 |
| A8 | 100 | 1.0 | 0.2 | 0.05 | 0.2 | a10 | 1.5 |
| A9 | 100 | 1.0 | 0.2 | 0.05 | 0.2 | a11 | 1.5 |
| A10 | 100 | 0.5 | 0.3 | 0.3 | 0.15 | a12 | 1.3 |
| A11 | 100 | 0.5 | 0.3 | 0.3 | 0.15 | a13 | 1.3 |
| A12 | 100 | 0.5 | 0.3 | 0.3 | 0.15 | a14 | 1.3 |
| A13 | 100 | 0.8 | 0.5 | 0.1 | 0.15 | a14 | 1.7 |
| A14 | 100 | 1.5 | 0.5 | 0.2 | 0.2 | a15 | 2.0 |
| A15 | 100 | 1.5 | 0.5 | 0.2 | 0.2 | a16 | 2.0 |
| A16 | 100 | 1.5 | 0.5 | 0.2 | 0.2 | a17 | 2.0 |

Test Examples

The following characteristics were measured using the test specimen manufactured in the inventive examples and the comparative examples.

1. Electrical Characteristics

Changes of the capacitance and dielectric loss of the respective test specimen that vary according to changes of an AC voltage of 0.01V to 10V were measured using a capacitance meter (4278A, Agilent Technologies) at 1 KHz and 1V. The capacitance and dielectric loss were obtained when voltage being applied per unit thickness of dielectrics was 1V/μm. The obtained capacitance and the mean thickness of dielectric layers, the number of dielectric layers being laminated and an electrode area of the fired test specimen were substituted into the following equation to obtain permittivity values according to different firing temperatures.

$$C = \epsilon_r \cdot \epsilon_0 \cdot N \cdot S / t_d \qquad \text{Equation,}$$

where C is capacitance, $\in_r$ is permittivity of dielectrics, $\in_0$ is vacuum permittivity, N is the number of dielectric layers being laminated, S is an electrode area and $t_d$ is the thickness of dielectric layers.

2. Hot Insulation Resistance (Hot-IR)

Insulation resistance was measured using hot insulation resistance measuring equipment by setting voltage, where a voltage of 6.3V is applied per unit thickness of dielectrics (6.3V/μm), to a rated voltage of 1Vr at a constant temperature of 150° C. Here, the dielectric breakdown threshold voltage of each of the test specimens was set to voltage when the insulation resistance of each test specimen decreased below $10^5 \Omega$ as the applied voltage increased (increase of DC voltage) at thirty-minute intervals.

3. Temperature Dependence of Permittivity

Temperature coefficients of capacitance were measured in a zone of –55° C. to 135° C. using temperature coefficient of capacitance (TCC) measuring equipment (4220A test chamber). The measurement was performed when a temperature coefficient of capacitance at 85° C. in comparison to a temperature coefficient of capacitance at 25° C. was set as a representative value. The results of measuring the general electric characteristics are shown in Table 3.

–55° C. to 85° C. (reference temperature 25° C.). All of the inventive examples according to this invention satisfy the EIA standard.

On the other hand, the comparative examples (B1 to B4) containing glass powder free of rare earth oxides ($Re_2O_3$) had low hot insulation resistance. The comparative example (B5 or B6) including glass powder containing inadequate or excessive rare earth oxides ($Re_2O_3$) exhibited low sinterability, low permittivity and low hot IR.

As described above, the dielectric compositions according to the embodiment of the invention can evenly sinter dielectric layers containing $BaTiO_3$ at a low temperature of 1100° C. or less. Therefore, sintering shrinkage mismatch between the internal electrode layers and the dielectric layers is reduced to thereby prevent the agglomeration of the internal electrodes. Accordingly, the short ratio can be minimized, and capacitance can be maximized. Furthermore, multilayer ceramic capacitors with high levels of reliability having excellent electrical characteristics, hot insulation resistance and X5R characteristics can be manufactured.

As set forth above, according to exemplary embodiments of the invention, dielectric compositions including glass compositions can be sintered at a low temperature of 1100° C. or

TABLE 3

| Classification | Firing temperature (° C.) | Dielectric constant | Dielectric Loss (%) | Threshold voltage (1 Vr = 6.3 V/μm) | TCC (85° C.) (%) | |
|---|---|---|---|---|---|---|
| B1 | 1100 | 3200 | 7.2 | 2.5 Vr | –13.0 | Low hot IR |
|  | 1120 | 3500 | 8.1 | 2.5 Vr | –14.2 | Low hot IR |
| B2 | 1080 | 3000 | 6.4 | 3.0 Vr | –12.0 | Low hot IR |
|  | 1100 | 3100 | 6.6 | 2.5 Vr | –12.6 | Low hot IR |
| B3 | 1100 | 3310 | 6.8 | 3.0 Vr | –10.3 | Low hot IR |
| B4 | 1080 | 3500 | 7.3 | 3.0 Vr | –10.1 | Low hot IR |
| B5 | 1060 | 2300 | 4.2 | 1.5 Vr | –8.3 | Low permittivity Low hot IR |
|  | 1080 | 2450 | 4.4 | 1.5 Vr | –8.1 | Low permittivity Low hot IR |
| B6 | 1110 | — | — | — | — | unsintered |
|  | 1130 | 3600 | 9.7 | 3.0 Vr | –11.9 | Low sinterability Low hot IR |
| A1 | 1080 | 3000 | 7.3 | 4.5 Vr | –8.9 |  |
| A2 | 1080 | 3300 | 7.6 | 5.5 Vr | –9.5 |  |
| A3 | 1100 | 3110 | 6.6 | 5.0 Vr | –7.5 |  |
| A4 | 1100 | 3210 | 6.8 | 6.5 Vr | –9.5 |  |
| A5 | 1080 | 3420 | 7.6 | 7.5 Vr | –10.0 |  |
| A6 | 1100 | 3540 | 8.5 | 5.5 Vr | –8.0 |  |
| A7 | 1100 | 3100 | 7.0 | 7.0 Vr | –6.6 |  |
| A8 | 1090 | 3500 | 8.2 | 7.0 Vr | –8.8 |  |
| A9 | 1070 | 3600 | 8.6 | 8.0 Vr | –9.7 |  |
| A10 | 1090 | 3120 | 6.6 | 6.0 Vr | –6.8 |  |
| A11 | 1060 | 3380 | 7.9 | 6.0 Vr | –7.7 |  |
| A12 | 1060 | 3650 | 8.0 | 8.5 Vr | –7.9 |  |
| A13 | 1090 | 3550 | 9.0 | 6.5 Vr | –10.3 |  |
| A14 | 1070 | 2870 | 5.2 | 6.5 Vr | –7.9 |  |
| A15 | 1050 | 2910 | 7.3 | 7.0 Vr | –10.3 |  |
| A16 | 1050 | 3010 | 7.4 | 8.0 Vr | –10.2 |  |

As shown in Table 3, the inventive examples (A1 to A16) were sintered at a temperature of 1100° C. or less, exhibited high permittivity values and had stable temperature coefficients of capacitance TCC and enhanced hot insulation resistance. Therefore, the inventive examples can have 400 dielectric layers stacked on one another. Further, X5R characteristics of the EIA standard are required according to the purpose of capacitors. According to this standard, the temperature coefficient of capacitance ΔC needs to be within ±15% based on less to reduce the agglomeration of internal electrodes and increase the dispersibility of rare earth oxides, so that the dielectric compositions can have enhanced hot insulation resistance and excellent electrical characteristics. Therefore, multilayer ceramic capacitors containing the dielectric compositions can have high capacitance, excellent electrical characteristics and hot insulation resistance to ensure high levels of reliability.

While the present invention has been shown and described in connection with the exemplary embodiments, it will be apparent to those skilled in the art that modifications and variations can be made without departing from the spirit and scope of the invention as defined by the appended claims.

What is claimed is:

1. Borosilicate glass compositions for a sintering agent satisfying the following equation, $$a\text{R}_2\text{O}\text{-}b\text{MO}\text{-}c\text{Re}_2\text{O}_3\text{-}d\text{B}_2\text{O}_3\text{-}e\text{SiO}_2 \quad \text{Equation,}$$

where $\text{R}_2\text{O}$ is an alkali oxide, MO is an alkaline earth oxide, $\text{Re}_2\text{O}_3$ is a rare earth oxide, $a+b+c+d+e=100$, $5 \leq a \leq 20$, $0 \leq b \leq 20$, $5 \leq c \leq 20$, $10 \leq d \leq 30$ and $40 \leq e \leq 70$ are satisfied.

2. The borosilicate glass compositions of claim 1, wherein the $\text{R}_2\text{O}$ is at least one alkali oxide selected from the group consisting of $\text{Li}_2\text{O}$ and $\text{K}_2\text{O}$.

3. The borosilicate glass compositions of claim 1, wherein the MO is at least one alkaline earth oxide selected from the group consisting of CaO and BaO.

4. The borosilicate glass compositions of claim 1, wherein $\text{Re}_2\text{O}_3$ is at least one rare earth oxide selected from the group consisting of $\text{Y}_2\text{O}_3$, $\text{Ho}_2\text{O}_3$ and $\text{Dy}_2\text{O}_3$.

5. Dielectric compositions comprising:
   barium titanate ($\text{BaTiO}_3$); and
   0.1 to 3.0 moles of glass powder containing the borosilicate glass compositions per 100 moles of the barium titanate ($\text{BaTiO}_3$),
   wherein borosilicate Mass compositions satisfying the following equation $$a\text{R}_2\text{O}\text{-}b\text{MO}\text{-}c\text{Re}_2\text{O}_3\text{-}d\text{B}_2\text{O}_3\text{-}e\text{SiO}_2 \quad \text{Equation,}$$

where $\text{R}_2\text{O}$ is an alkali oxide, MO is an alkaline earth oxide, $\text{Re}_2\text{O}_3$ is a rare earth oxide, $a+b+c$ $d+e=100$, $5 \leq a \leq 20$, $0 \leq b \leq 20$, $5 \leq c \leq 20$, $10 \leq d \leq 30$ and $40 \leq e \leq 70$ are satisfied.

6. The dielectric compositions of claim 5, wherein the barium titanate ($\text{BaTiO}_3$) has a mean diameter ranging from 150 nm to 200 nm.

7. The dielectric compositions of claim 5, wherein the glass powder has a mean diameter ranging from 100 nm to 150 nm.

8. The dielectric compositions of claim 5, further comprising at least one additive selected from the group consisting of MgO, a rare earth oxide, MnO and $\text{V}_2\text{O}_5$.

9. The dielectric compositions of claim 8, wherein the rare earth oxide comprises at least one selected from $\text{Y}_2\text{O}_3$, $\text{Ho}_2\text{O}_3$ and $\text{Dy}_2\text{O}_3$.

10. A multilayer ceramic capacitor including:
    a plurality of dielectric layers containing the dielectric compositions according to claim 5;
    internal electrodes provided between the dielectric layers; and
    external electrodes electrically connected to the internal electrodes.

11. The multilayer ceramic capacitor of claim 10, wherein each of the dielectric layers has a thickness ranging from 1.0 µm to 1.5 µm.

12. The multilayer ceramic capacitor of claim 10, wherein the internal electrodes comprise nickel (Ni) or Ni alloy.

13. The multilayer ceramic capacitor of claim 10, wherein the external electrodes comprise Cu or Ni.

* * * * *